April 21, 1959 B. McDERMOTT 2,883,473
TRANSISTOR GATING CIRCUIT
Filed Dec. 24, 1957
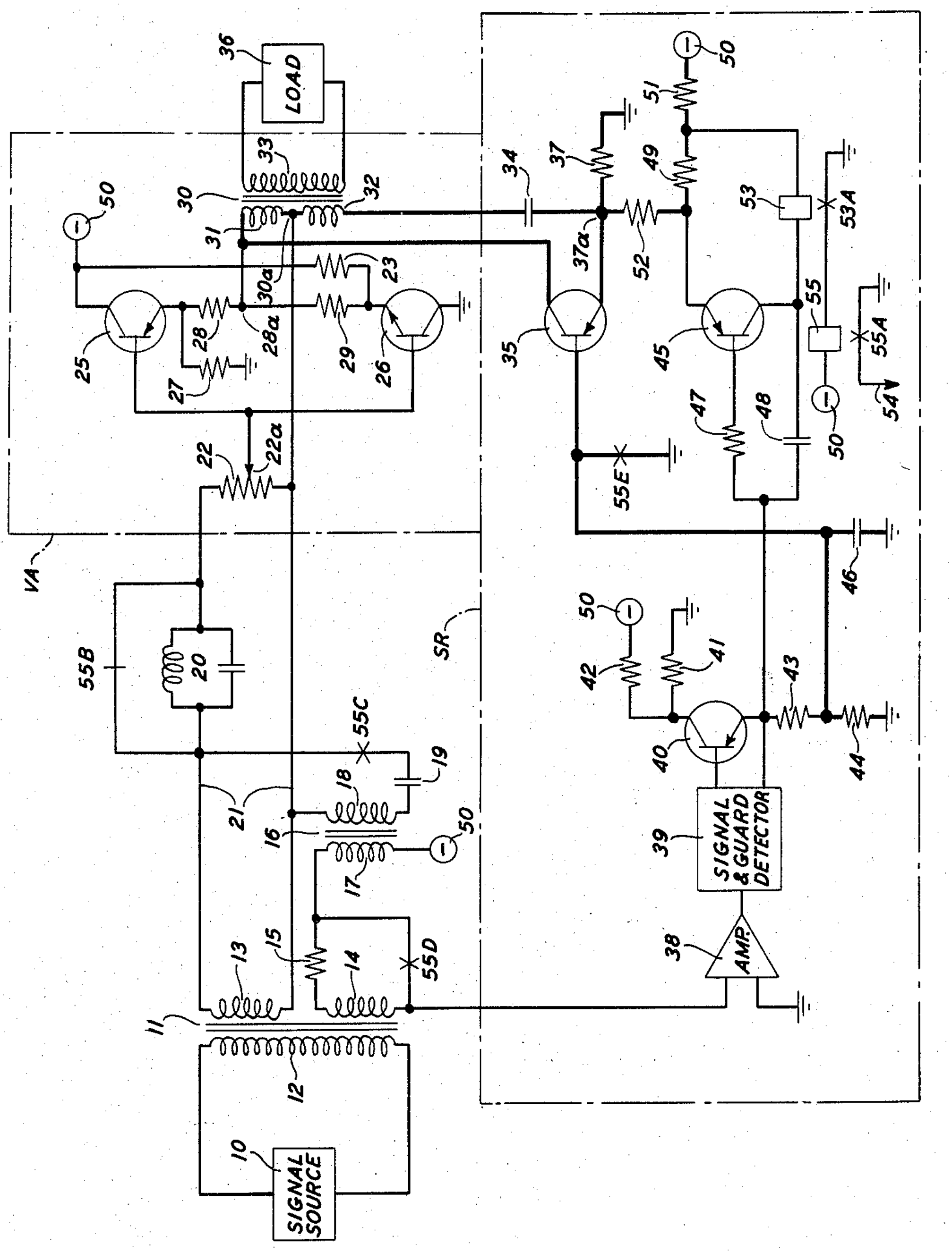
INVENTOR
B. McDERMOTT
BY Patrick J. Roche
ATTORNEY.

2,883,473
Patented Apr. 21, 1959

2,883,473

TRANSISTOR GATING CIRCUIT

Byron McDermott, Chatham Township, Morris County, N.J., assignor to Bell Telephone Laboratories, Incorporated, New York, N.Y., a corporation of New York Application December 24, 1957, Serial No. 704,986

7 Claims. (Cl. 179—84)

This invention relates to a gating circuit for a voice-frequency signaling transmission system, and more specifically to such a gating circuit using transistors.

Of the many uses to which transistor gating circuits may be put, a significant application relates to a voice-frequency alternating-current signaling system. In such a signaling system, signals are transmitted over voice-frequency channels between telephone central offices and toll switching centers, for example, by alternating-current impulses of a single voice frequency. It is necessary to confine these signals to a single link where a multi-link path exists between originating and terminating offices. However, upon the cessation of signaling impulses when a through-connection is established, the full voice-frequency band must be made available for talking purposes on a multi-link basis. Therefore, an arrangement must be so provided as to operate immediately on receipt of a voice-frequency signal to block the voice path to the current of such signal. This is accomplished in a novel manner in accordance with the present invention.

The main object of the present invention is to gate a normally operating voice transmission path in a voice-frequency transmission system in such a manner as to block the transmission of voice-frequency currents during intervals of the transmission of alternating-current signaling current of a single frequency in the voice band.

It is another object to confine substantially a voice-frequency signaling current to a limited transmission path in a voice-frequency transmission system.

It is still another object to render a voice-frequency transmission path ineffective to transmit during the presence of signaling current having a frequency in the voice-frequency range.

It is a further object to preclude substantially the transmission of a voice-frequency signaling current beyond one link in a tandem multi-link voice-frequency transmission system.

It is still a further object to sectionalize substantially a multi-link voice-frequency transmission system for alternating-current signaling current in the voice-frequency range.

It is yet a further object to prevent the leakage of voice-frequency signaling current into the voice-frequency transmission path.

It is also an object to gate one transistor into a state of conduction by another transistor substantially instantaneously whenever a predetermined signal level is reached in the latter.

It is a further object to minimize the duration of a spurt of signaling tone which passes beyond the first link of a tandem telephone trunking system by so gating the output of a voice-frequency amplifier as to preclude transmission therethrough immediately upon receipt of signaling tone.

A feature of the invention resides in the use of a single gating stage.

A clear and complete understanding of the invention will be hereinafter obtained by considering a system embodying the invention as represented schematically in the single figure of the drawing. This invention is not, however, to be deemed limited in its application to the particular system illustrated in the drawing but is generally applicable to any two-channel voice alternating-current amplifying system in which exclusive use of one channel alone is desired for the transmission of speech alternating currents. The single figure of the drawing represents in schematic diagram form the receiving section of a voice-frequency signaling system intended for telephone use and including a specific embodiment of the invention. Relay contacts are shown on the drawing in detached form, an "X" indicating a make contact and a vertical bar, a break contact.

The receiver section of an inband voice-frequency signaling system using vacuum tubes is disclosed in United States Patent No. 2,642,500, issued June 16, 1953, to W. W. Fritschi, R. O. Soffel and A. Weaver. In the system disclosed in the patent, dial pulse and supervisory signals are transmitted over two-wire or four-wire trunks between switching centers by means of interruptions of a signaling tone lying in the voice-frequency band, for example, at 2600 cycles per second. At each switching center the trunk line is terminated in a signaling set including a transmitting section and a receiving section. The function of the transmitting section is to generate the signaling tone, to transform the direct-current dial pulses and supervisory signals into alternating-current impulses, and to apply these tone pulses to the transmitting pair of the trunk line. The function of the receiving section is to detect the presence or absence of signaling tone pulses incoming over the receiving pair of the trunk line, to transform the signaling-tone pulses when received into direct-current signals for operating the necessary switching circuits in the terminating office, and to prevent the transmission of tone pulses father along the talking circuits. The present invention relates to an improved gating circuit using transistors and provided in the receiver section of the voice-frequency signaling unit to preclude the transmission of voice-frequency signaling current to the normal voice-transmission paths of such unit.

Referring now to the single figure of the drawing, signal source 10 represents the receiving pair of an incoming four-wire trunk line over which may be received either the 2600-cycle signaling tone pulses or speech currents covering the full voice-frequency band from about 250 to 3000 cycles, as disclosed in the Fritschi et al. patent, supra. Transformer 11 is common to both the voice path and the signal receiver and comprises a primary winding 12 and a pair of secondary windings 13 and 14. This transformer provides coupling between the balanced-to-ground receiving pair of the incoming trunk line and the unbalanced-to-ground voice and signal receiver circuits by way of secondary windings 13 and 14, respectively.

The voice path extends from secondary winding 13 over a pair of conductors 21, 21 to a receiving potentiometer 22. Adjustable arm 22*a* of the potentiometer is connected to the base electrodes of a push-pull complementary symmetry transistor amplifier VA enclosed within the dot-dash box at the upper right-hand portion of the drawing and comprising p-n-p transistor 25 and n-p-n transistor 26, each of which includes base, collector and emitter electrodes in the well-known manner. The amplified output of transistors 25 and 26 is coupled by way of a transformer 30 having split primary windings 31 and 32 and an output secondary winding 33. Winding 33 is coupled to a load 36 which may be a pair of conductors leading through the trunk switching circuits to a toll trunk, as indicated in the Fritschi et al. patent, supra. One of the conductors 21, 21 and the associated end of potentiometer 22 are connected to the midpoint 30*a* of the primary windings 31 and 32. The connection of band-elimination filter elements 18, 19 and 20 and the function thereof will be hereinafter explained.

The purpose of the voice amplifier is two-fold: (1) to make up for the small bridging loss of voice currents in a signaling receiver SR discussed below, and (2) to prevent noise currents originating in the local switching-office equipment from reaching the input of the signal receiver and causing interference thereat, the latter purpose being attributable to one-way amplifier transmission. The operation of the voice amplifier will now be described. The voice amplifier comprises a Class AB push-pull arrangement which takes advanatge of the complementary symmetry characteristics of a matched p-n-p transistor 25 and a n-p-n transistor 26 in order to obviate the necessity for a phase splitter as normally required for providing push-pull drive. This push-pull type of transistor amplifier provides the increased power-handling capability required for toll circuit operation.

Direct-current bias is provided to transistors 25 and 26 from a negative potential source 50 by a voltage divider formed with resistors 23, 29, 28 and 27. Emitter-base bias for transistor 25 is constituted by the voltage developed across resistor 28, while the emitter-base bias for transistor 26 is the voltage appearing across resistor 29. Resistors 28 and 29, due to the connection of their common junction 28$a$ to the upper end of the primary winding 31 of transformer 30 and the further connection of the midpoint 30$a$ of windings 31 and 32 to the lower end of receiving potentiometer 22, have opposing direct currents flowing therethrough. When collector current flows in transistors 25 and 26 there is direct current flowing in the circuit from ground to the collector and emitter junctions of transistor 26, through resistors 29 and 28 and through the emitter and collector junctions of transistor 25 to the negative potential source 50. The direct current flowing in the two transistors may vary from about 0.8 milliampere in the absence of input voice alternating currents to as much as five milliamperes in the presence of input voice alternating currents.

The alternating-current input voltage supplied by signal source 10 appears across receiving potentiometer 22, which controls by its adjustable arm 22$a$ the level of the signal applied to the base electrodes of transistors 25 and 26. This alternating-current input voltage causes a current to flow through the base-emitter junctions of both transistors 25 and 26, which current flow in turn causes a change in the collector-emitter currents of both latter transistors. As in Class AB push-pull amplifiers, approximately one-half of the input alternating-current signal voltage causes one transistor to conduct while it cuts off the other transistor. The next succeeding second-half of the input alternating-current signal voltage causes the conducting and cut-off conditions of the two transistors to be reversed. In the instant circuit the positive half-cycles of the alternating-current input signal voltage cause transistor 26 to conduct and transistor 25 to cut off while the negative half-cycles of such signal voltage serves to cut off transistor 26 and to cause transistor 25 to conduct.

Alternating-current collector current flow for the conduction period of transistor 25 takes place in a circuit including its collector electrode, negative potential source 50 to ground, resistor 37, capacitor 34, primary windings 32 and 31, resistor 28, the emitter electrode, and back to the collector electrode. Similarly, the alternating-current flow for the conduction period of transistor 26 may be traced through a circuit including ground, its collector-emitter path, resistor 29, primary windings 31 and 32, capacitor 34, resistor 37, and ground. As a consequence, alternating current is caused to flow through the secondary winding 33 of transformer 30 and load 36 during each half-cycle of the input signal wave.

Turning now to the signal receiver SR indicated within the dot-dash box at the lower portion of the drawing, its purpose is to amplify and limit, if necessary, the 2600-cycle signaling current; to detect the 2600-cycle signaling current in the presence of all frequencies in the voice band and noise; to produce a direct current proportional to the amplitude of the alternating-current signaling tone, to amplify the direct current and to control the operation of electromagnetic relays in a manner that will be subsequently explained. The input circuit for the signal receiving path extends from the lower end of secondary winding 14 of input transformer 11 to the input of a suitable amplifier 38 which may be of a transistor type, and which has its output connected to a signal and guard detector 39.

Initially, current of the full voice-frequency band is applied directly from secondary winding 14 to amplifier 38. Later, after the relay 55 has been actuated in a manner that will be later described, its make-contact 55C connects secondary winding 18 of transformer 16 in a series circuit with capacitor 19, the latter circuit being connected in shunt of conductors 21, 21. Secondary winding 17 of transformer 16 has one end connected to negative potential source 50 and its opposite end connected through resistor 15 to the upper end of transformer winding 14. Capacitor 19 and primary winding 18 are so chosen with electrical characteristics as to be series resonant at the signaling frequency of 2600 cycles. Therefore, the predominant voltage appearing across winding 18 is at the frequency of the signaling tone which is 2600 cycles per second. At the same time that contact 55C connects the series resonant circuit 18, 19 across the conductors 21, 21 contact 55D also operates to short-circuit winding 14 of transformer 11 through resistor 15. The input to amplifier 38 is then obtained from the signaling tone developed across the secondary winding 17 of transformer 16. As a consequence, the input to amplifier 38 is limited to signaling tone only and thereby the sensitivity of the signal receiver is increased.

Signal and guard detector 39 comprises both signal and guard detection circuits which are of a type more fully described in the aforementioned Fritschi et al. patent. Briefly, the signal and guard detector 39 may include, for example, parallel and series L–C circuits resonant at the frequency of the signaling tone, each of which circuits is shunted by a half-wave rectifier and a resistor-capacitor load. Across the resistor-capacitor loads are developed direct voltages proportional respectively to the amounts of alternating-current voltages corresponding to the signaling and other than signaling frequency present in the outputs of signal source 10 and amplifier 38. Whenever the guard—other than signaling—voltage predominates as during a subscriber conversion, the direct-current output voltage of detector 39 is applied to the base of a direct-current transistor amplifier 40 to cut off the latter and prevent operation of signal relays 53 and 55. When, however, pure signaling tone predominates, the signal voltage exceeds the guard voltage and the direct-current amplifier 40 is thereby caused to conduct. The presence of the guard voltage at all times is an important factor in avoiding signal imitation by speech.

In addition to direct-current transistor amplifier 40, the signal receiver comprises a direct-current transistor amplifier 45, both amplifiers being identical in characteristics to transistor 25. Transistor amplifier 40 has associated with its emitter electrode resistors 43 and 44 in series to ground, the resistor 44 being part of a gating circuit to be hereinafter discussed. Collector biasing potential is derived from a voltage divider comprising resistors 41 and 42 in series with potential source 50 and ground, respectively. The collector electrode is connected to the junction of resistors 41 and 42. The emitter of transistor 40 is directly connected to the base of transistor 45 through resistor 47. A capacitor 46 is connected between ground and the junction of resistors 43 and 44 for a purpose to be described later. In the absence of signaling current at the input of detector 39 the guard voltage output of detector 39 biases transistor 40 to cut off. Transistor 45 includes in its collector-emitter circuit the operating winding of a sensitive electromagnetic relay 53 and a voltage divider comprising resistors 51, 49, 52 and 37 connected in series between negative potential source 50 and ground.

The operation of direct-current amplifiers 40 and 45 is as follows. When the signal and guard detector 39 receives sufficient current of signaling-tone frequency to overcome the guard voltage, a driving voltage is applied by this detector to the base of transistor 40 for overcoming the previously mentioned guard voltage back bias. This transistor operates to cause saturation collector current to flow therein. Under this condition the voltage drop from emitter to collector of transistor 40 is small and the current flowing through resistors 43 and 44 is substantially the collector current. This creates an emitter-to-base bias on transistor 45, which is adequate in magnitude to cause transistor 45 to operate and thereby draw current therein. This transistor then draws collector current from potential source 50 through resistor 51 and the operating winding of relay 53. Relay 53 operates to close make-contact 53A which is connected in a local circuit with the operating winding of relay 55 and potential source 50. Relay 55 then operates. Capacitor 48 connected between the collector of transistor 45 and the emitter of transistor 40 reduces the effect of direct-current transients on the operation of transistor 45. An electronic time delay may be provided between the successive operations of transistors 40 and 45 to prevent the false operations thereof on signaling tone spurts of short duration, essentially in the manner disclosed in the Fritschi et al. patent, supra. Details of an electronic time delay circuit using transistors and useful for the purpose herein indicated are disclosed in the application of W. W. Fritschi, Serial No. 704,991, filed of even date herewith.

Besides the function of delivering a ground response by way of make-contact 55A and lead 54 to the switching circuits of a telephone toll office as mentioned in the Fritschi et al. patent, supra, relay 55 in response to its operation performs other functions as well. Several of these functions have already been discussed. An important additional function is to prevent the transmission of signaling current through the voice amplifier to the next succeeding link of connecting circuits as represented by load 36. This is accomplished by way of the previously mentioned contacts 55B and 55C which are effective to introduce a band-elimination filter for signaling tone in the path of the voice amplifier in a manner which will now be described. The band-elimination filter comprises two sections: namely, a parallel capacitor-inductor circuit 20 resonant at signaling-tone frequency and a series circuit also resonant at signaling-tone frequency and including capacitor 19 and the primary winding 18 of transformer 16 as previously explained. Parallel resonant circuit 20 is introduced in series with one conductor 21 connected in the input of the voice amplifier by the opening of break-contact 55B; and the series resonant circuit 18, 19 is shunted across conductors 21, 21 leading to the input of the voice amplifier by the closing of make-contact 55C. This effectively blocks the transmission of signaling-tone current over the voice path and through the voice amplifier and thereby confines the signaling-tone current to a preselected single link of a multi-link voice trunking circuit. At the same time, however, speech can be transmitted over the voice path and through the voice amplifier between toll operators, for example, for intercept or supervisory purposes. Because relay 55 does not operate immediately upon receipt of signaling tone due to the aforementioned electronic time-delay, if any, and/or to the mechanical inertia encountered in the operation of relays 53 and 55, it may be possible for a certain amount, say for example up to the first 40 to 50 milliseconds, of signaling tone to leak through the voice amplifier into the next succeeding toll link and cause thereat spurious operation of other signaling circuits.

To avoid such spurious operation, a gating circuit according to the present invention effects a blocking of the output of the voice amplifier for the period between receipt of signaling tone and operation of relay 55, in a manner which will now be explained. Interposed between the signal receiver and voice amplifier is a transistor 35 which is identical with transistor 25 and which serves as the gating device. Transistor 35 includes base, emitter and collector electrodes. The emitter electrode is connected to a common junction 37*a* of resistors 37 and 52 and capacitor 34. Resistors 37 and 52 form part of a voltage divider connected between potential source 50 and ground and also including resistors 49 and 51, as already mentioned. The base electrode is directly connected to the junction of the previously mentioned resistors 43 and 44 connected serially in the emitter circuit of transistor 40, and also to ground through a make-contact 55E of relay 55. The collector electrode of transistor 35 is joined to the upper end of the primary winding 31 of output transformer 30 and to the common junction 28*a* of the emitter circuits of voice amplifiers 25 and 26.

Due to the fact that no current flows through resistor 44 in the base circuit of transistor 35 when no signaling current is being received in the signal receiver, the base-emitter junction of transistor 35 is slightly back biased by the voltage across resistor 37, which forms part of a voltage divider across potential source 50 as previously pointed out. Therefore, gating transistor 35 exhibits a high collector-to-emitter impedance which has substantially no shunting effect on the primary windings 31 and 32 of output transformer 30. Resistor 37 is chosen, however, to be small enough in effective resistance so as not appreciably to affect the normal amplifier characteristics of transistor 35.

The receipt of an initial spurt of signaling tone by way of detector 39 in the signal receiver as above explained causes transistor 40 to conduct heavily in the manner already described. There is therefore developed across resistor 44, which is common to the emitter circuit of transistor 40 and the base circuit of gating transistor 35, a corresponding amount of negative potential which exceeds that produced across resistor 37 in the emitter circuit of transistor 35. The potential across resistor 44 acts as a strong forward bias on the base-emitter junction of transistor 35 of a magnitude which is sufficient to cause saturation collector current to flow. As a consequence, the collector-emitter circuit of transistor 35 exhibits a low impedance and thus effectively short-circuits the primary windings 31 and 32 of output transformer 30 in series with the small effective capacitance of capacitor 34. The output of voice amplifier VA is thereby completely blocked by means of the above-noted short circuit, and thus the spurt of signaling tone is not transmitted through transformer 30 to load 36.

As soon as relay 55 is caused to operate in the manner previously pointed out, should the signaling-tone pulse be a legitimate one of the required minimum duration, contacts 55C and 55E are closed and contact 55B is opened. Contacts 55B and 55C connect the band-elimination filter elements 20 and 18, 19 in the voice path 21 thereby blocking signaling tone but passing other voice band frequencies as above mentioned. Contact 55E connects the base electrode of transistor 35 to ground, thereby removing the forward bias from this transistor and restoring it to its high collector-emitter impedance condition. The output of the voice amplifier is then unblocked by the removal of the short circuit across the primary windings 31 and 32 whereby the voice amplifier is restored to its normal condition.

The normal back bias on transistor 35 due to the potential existing across resistor 37 tends to eliminate feedthrough of spurious voltages or noise from the signal receiver to the voice amplifier when transistor 40 is not conducting. Capacitor 46, shunted across resistor 44, aids in this respect also by serving in the well known manner as a low-pass filter preventing leakage of such signaling-tone voltage into the output of the voice amplifier and thereby into the load when transistor 40 is conducting.

It will be obvious to those skilled in the art that gating transistor 35 would be equally effective in shorting the primary winding of output transformer 30 if the latter were preceded by a single-ended amplifier instead of a push-pull amplifier as described in this specification. It will be further obvious that if a small loss can be tolerated in the transmission path between the voice and signaling current source and the load the amplifier itself can be omitted without detracting from the utility of the invention.

While the gating circuit of the invention has been described with reference to a particular embodiment in a voice-frequency signaling system, it is to be understood that such embodiment is intended to be illustrative of the principles of the invention and that numerous other embodiments may be devised by those skilled in the art without departing from the spirit and scope of the invention. For example, the invention is as well applicable to other two-channel signal amplifying transmission systems in which it is desired that only one channel be used at a given time and a signal present in one channel can block the transmisison of a second signal over the other channel.

What is claimed is:

1. In a voice-frequency transmission system employing signaling current in the voice-frequency range and comprising a source of signaling and voice currents, a load, and circuit means including a pair of conductors for interconnecting said source and load to transmit the voice currents therebetween, means for establishing a high-impedance or a low-impedance path in shunt of said conductors to gate said circuit means and thereby to control the transmisison of voice currents between said source and load, comprising means coupled to said source for detecting and amplifying the signaling current, a transistor including base, emitter and collector electrodes, means for connecting said base electrode to the output of said detecting and amplifying means, means for connecting said emitter and collector electrodes in shunt of said two conductors, means for biasing said emitter electrode to hold said transistor cut off in the absence of detected signaling currents thereby establishing said collector and emitter as said high-impedance path in shunt of said conductors, and means connected in circuit with said detecting and amplifying means and responsive to the detected signaling current for supplying a voltage to said base electrode to overcome the emitter biasing voltage and institute conduction in said transistor thereby establishing said collector and emitter as said low-impedance path in shunt of said conductors.

2. In a signaling system employing signaling current of a particular frequency in the voice-frequency range and comprising a source of voice and signaling currents, an amplifier for said voice currents, means for coupling the input of said voice amplifier to said source, a load for said voice amplifier, an output transformer having a primary winding connected to the output of said voice amplifier and a secondary winding connected to said load, means coupled to said source for detecting said signaling current, a first transistor having base, emitted and collector electrodes for amplifying the detected signaling current, said base being connected to the output of said detecting means and means for biasing said collector to hold said transistor cut off in the absence of signaling current at the input of said detecting means, said transistor becoming conductive in response to the detected signaling current applied to said base for overcoming said collector bias, means for substantially precluding the transmission of voice and signaling currents to said load when said signaling current is being detected, comprising a second transistor having base, emitter and collector electrodes, said last-mentioned collector and emitter electrodes being connected in shunt of said primary transformer winding, a resistor connected between said first-mentioned emitter electrode and ground, means connecting the non-ground end of said resistor to said second-mentioned base electrode, and means for biasing said second-mentioned emitter to establish a high-impedance path through said second-mentioned collector and emitter electrodes in the absence of signaling current at the input of said detecting means, said resistor developing thereacross in response to conduction in said first transistor a voltage of sufficient magnitude and proper polarity to forward bias said second transistor into the saturated condition for establishing a low-impedance path through said second-mentioned collector and emitter electrodes thereby effectively short-circuiting said primary transformer winding.

3. The signaling system of claim 2 in which said voice amplifier comprises a pair of transistors of complementary conductivity types connected in a push-pull arrangement, each including base, a collector and emitter electrodes, a common junction for the emitter electrodes of said pair of transistors and the collector electrode of said second transistor, the collector electrode of one of said pair of transistors being grounded, and said primary transformer winding having one terminal connected to said common junction and another terminal connected to a further junction common to the emitter electrode of said second transistor and said biasing means therefor.

4. The signaling system of claim 2 which includes a capacitor connected in shunt of said resistor whereby said capacitor and resistor constitute a low-pass filter for precluding leakage of said signaling current into said load.

5. In a signaling system in which current of a particular frequency within the voice band is used to effect transmission of signals, an amplifier for voice-frequency currents including a pair of transistors of opposite conductivity types connected in a push-pull arrangement and an output transformer having a primary winding coupled to said transistors, a detector responsive only to signaling current for rectifying said signaling current, a direct-current amplifier for said rectified signaling current including a third transistor having an emitter electrode, relay means adapted to be actuated by said direct-current amplifier for repeating said signaling current as direct-current pulses, said relay means being subject to a certain delay in operation, band-elimination filter means for the frequency of said signaling current, contact means associated with said relay means for inserting said filter means in the input circuit of said voice amplifier to preclude the transmission of signaling current therethrough after said relay means has been actuated, and means for cutting off said voice amplifier to all frequencies in the interval between the receipt of signaling current and the actuation of said relay means comprising a fourth transistor having base, emitter and collector electrodes for blocking said voice amplifier, the emitter and collector electrodes of said fourth transistor being connected across the primary winding of said output transformer, bias means coupled to the emitter electrode of said fourth transistor for holding said transistor in the cut-off condition in the absence of signaling current, and a resistor connected in circuit with the emitter of said third transistor and the base of said fourth transistor, the voltage developed across said resistor being sufficient in magnitude to gate said fourth transistor into conduction thereby short-circuiting the primary winding of said output transformer.

6. The signaling system in accordance with claim 5 in which said relay means includes a further contact for grounding the base electrode of said fourth transistor upon actuation, thereby unblocking said voice amplifier.

7. In combination, a source of voice-frequency energy and of signaling energy having a predetermined frequency within the voice-frequency band, a first channel for amplifying said voice-frequency energy, a second channel for amplifying and detecting signaling energy in the presence of said voice-frequency energy, and means for coupling said source to said first and second channels; said first channel comprising a frequency-selective network for blocking signal energy from said channel connectable therein, a first and second transistors of opposite conductivity types arranged in push-pull fashion, a load circuit, and an output transformer coupling said first and second transistors to said load circuit; said second channel comprising detector means for said signaling energy for deriving a direct-current potential proportional to the level of said signaling energy, a third transistor including an emitter normally biased to cut off in the absence of signaling energy but adapted to being driven into saturation conduction by said direct-current potential in the presence of signaling energy, relay means subject to a determinable delay interval in operating in circuit with said third transistor for repeating signaling energy on a direct-current basis; a fourth transistor having base, emitter and collector electrodes in circuit with the emitter of said third transistor and the primary winding of said output transformer, means for normally back-biasing said fourth transistor into the non-conducting condition; and means for short-circuiting the primary winding of said output transformer during said delay interval comprising means including a resistor in circuit with the emitter of said third transistor and the base of said fourth transistor, the potential produced across said resistor during the conduction period of said third transistor being adequate to overcome the normal back bias on said fourth transistor and to forward bias said fourth transistor into the saturated condition, said relay means being also adapted upon actuation to connect said frequency-selective network in series with said first and second transistors and to remove the forward bias on said fourth transistor.

No references cited.